United States Patent
Chien

(10) Patent No.: US 9,479,670 B2
(45) Date of Patent: Oct. 25, 2016

(54) ELECTRONIC DEVICE AND METHOD FOR TAKING IMAGE OF FACE

(71) Applicant: HON HAI PRECISION INDUSTRY CO., LTD., New Taipei (TW)

(72) Inventor: Cheng-Ching Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/753,872

(22) Filed: Jun. 29, 2015

(65) Prior Publication Data

US 2016/0219182 A1    Jul. 28, 2016

(30) Foreign Application Priority Data

Jan. 26, 2015 (TW) .............................. 104102443 A

(51) Int. Cl.
*H04N 5/232* (2006.01)
*H04N 1/21* (2006.01)
*H04N 5/225* (2006.01)

(52) U.S. Cl.
CPC .......... *H04N 1/2112* (2013.01); *H04N 5/2256* (2013.01); *H04N 5/23219* (2013.01)

(58) Field of Classification Search
CPC ............. H04N 1/2112; H04N 5/2256; H04N 5/23219; H04N 5/232
See application file for complete search history.

(56) References Cited

U.S. PATENT DOCUMENTS

| | | | | |
|---|---|---|---|---|
| 4,238,146 A * | 12/1980 | Kitamura | ............... | G03B 17/20 396/239 |
| 8,111,315 B2 * | 2/2012 | Uchida | ............... | G06K 9/00664 348/333.02 |
| 8,115,816 B2 * | 2/2012 | Ogawa | ............... | G06K 9/00362 348/207.99 |
| 8,970,762 B2 * | 3/2015 | Kim | ................... | H04N 5/23219 348/211.4 |
| 2004/0246342 A1 * | 12/2004 | Kim | ....................... | H04N 5/232 348/207.99 |
| 2008/0037841 A1 * | 2/2008 | Ogawa | .................... | H04N 5/232 382/118 |
| 2009/0010628 A1 * | 1/2009 | Koskinen | ............... | G03B 19/02 396/5 |
| 2009/0102940 A1 * | 4/2009 | Uchida | .............. | G06K 9/00664 348/222.1 |
| 2009/0225173 A1 * | 9/2009 | Ogawa | ............... | G06K 9/00362 348/207.99 |
| 2011/0134269 A1 * | 6/2011 | Kim | .................... | H04N 5/23219 348/222.1 |
| 2013/0201359 A1 * | 8/2013 | Wu et al. | ........... | H04N 5/23219 348/222.1 |
| 2014/0267817 A1 * | 9/2014 | Zerovec | ............. | H04N 5/23216 348/220.1 |

* cited by examiner

*Primary Examiner* — Nicholas Giles
(74) *Attorney, Agent, or Firm* — Zhigang Ma

(57) ABSTRACT

A method for taking image of face which is executable on an electronic device requires a speaker and a camera. An activation of the camera is detected and the speaker is controlled to emit sound from an audio file to draw attention of a target. If the face of the target is not facing the camera for a predetermined duration, a volume of the emitted sound is increased or another audio file replaces the currently played audio file and the camera is triggered to take an image of the target when the target is fully facing the camera.

3 Claims, 3 Drawing Sheets

ELECTRONIC DEVICE AND METHOD FOR TAKING IMAGE OF FACE

CROSS-REFERENCE TO RELATED APPLICATIONS

This application claims priority to Taiwanese Patent Application No. 104102443 filed on Jan. 26, 2015, the contents of which are incorporated by reference herein.

FIELD

The subject matter herein generally relates to photography technology, and particularly to a method and an electronic device for taking image of a face with high quality.

BACKGROUND

A camera can be used for taking images. However, the image effect is not very ideal when a target does not face the camera.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
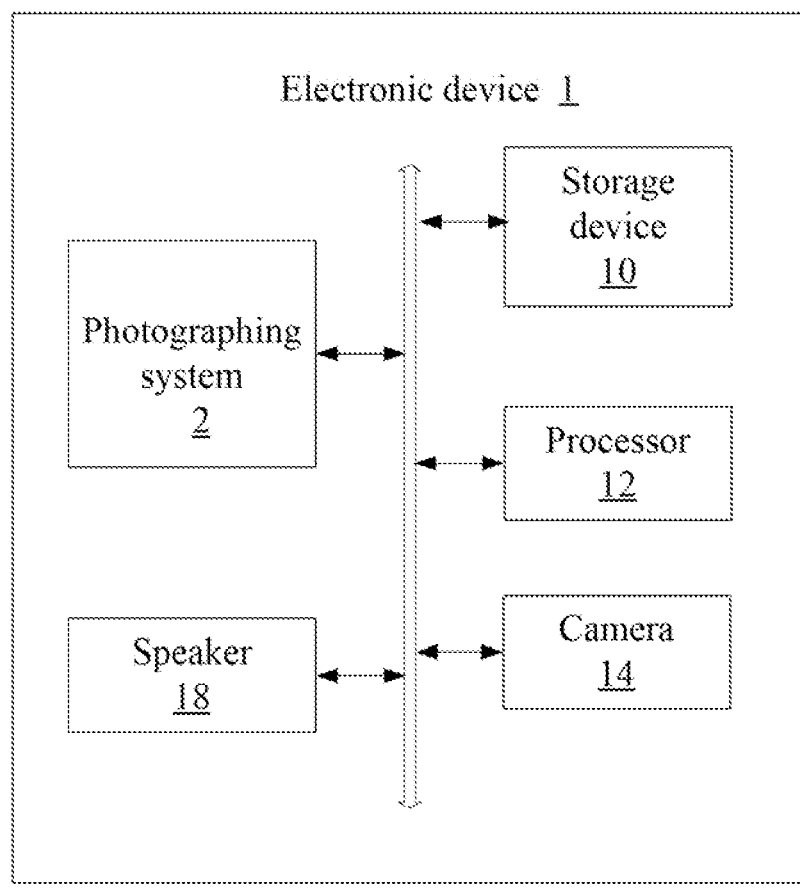
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The disclosure, referring to the accompanying drawings, is illustrated by way of examples and not by way of limitation. It should be noted that references to "an" or "one" embodiment in this disclosure are not necessarily to the same embodiment, and such references mean "at least one".

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "of, but not necessarily limited to"; it specifically indicates open-ended inclusion or membership in a so-described combination, group, series and the like.

FIG. 1 illustrates a block diagram of one embodiment of an electronic device. In at least one embodiment as shown in FIG. 1, an electronic device 1 includes, but is not limited to, a photographing system 2, a storage device 10, at least one processor 12, a camera 14, and a speaker 18. The electronic device 1 can be a smart phone, a tablet computer, a camcorder, a video recorder, a digital camera, or any other suitable electronic device. FIG. 1 illustrates only one example of the electronic device 1 that can include more or fewer components than illustrated, or have a different configuration of the various components in other embodiments.

In at least one embodiment, the storage device 10 can include various types of non-transitory computer-readable storage medium. For example, the storage device 10 can be an internal storage system, such as a flash memory, a random access memory (RAM) for temporary storage of information, and/or a read-only memory (ROM) for permanent storage of information. The storage device 10 can also be an external storage system, such as a hard disk, a storage card, or a data storage medium.

In at least one embodiment, the at least one processor 12 can be a central processing unit (CPU), a microprocessor, or other data processing chip that performs functions of the photographing system 2 in the electronic device 1.

In at least one embodiment, the camera 14 can be placed on the electronic device 1, or suspended from the electronic device 1. The camera 14 can be used to capture an image of a target.

In at least one embodiment, the speaker 18 can be placed on a shell of the electronic device 1, and can be used for emitting sound from an audio file when receiving a control signal from the at least one processor 12.

Figure 2:
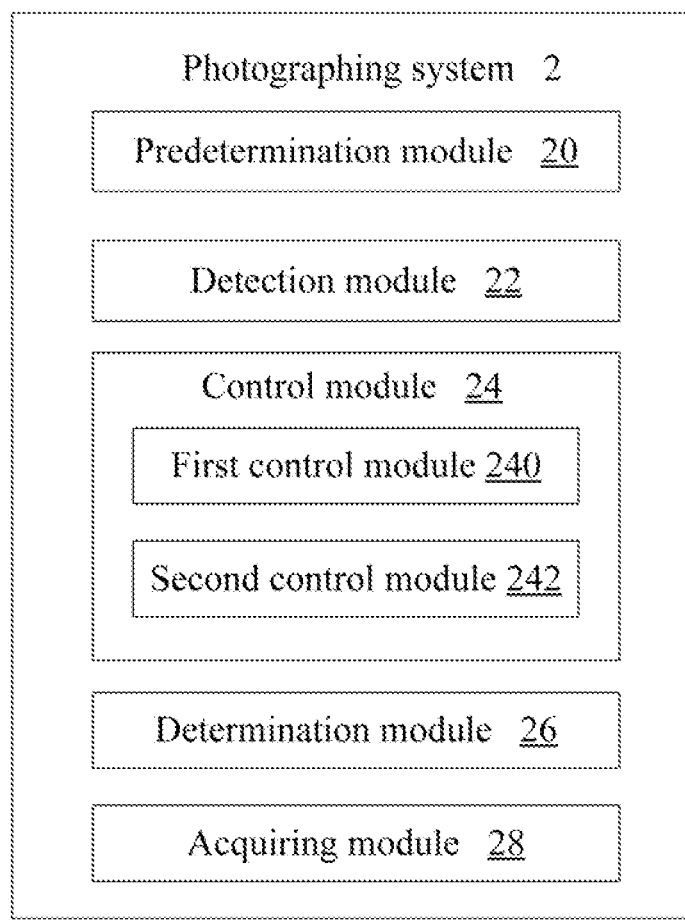
FIG. 2 is a block diagram of one embodiment of function modules of a photographing system in the electronic device in FIG. 1.

FIG. 2 is a block diagram of one embodiment of function modules of the photographing system. In at least one embodiment, the photographing system 2 can include a predetermination module 20, a detection module 22, a control module 24, a determination module 26, and an acquiring module 28. In some embodiments, the control module 24 can comprise a first control module 240, and a second control module 242. The function modules can include computerized codes in the form of one or more programs, which are stored in the storage device 10 of the electronic device 1. The at least one processor 12 executes the computerized codes to provide functions of the function modules.

The predetermination module 20 can predetermine at least one audio file in the storage device 10 of the electronic device 1. In some embodiments, the at least one audio file can comprise: "Harvest turnips", "Two tigers", "Several ducks", voices of people, or any other sound that can draw attention of the target. In some embodiments, the at least one audio file can be downloaded from the Internet.

The detection module 22 can detect whether the camera 14 of the electronic device 1 is activated. After a determination is made that the camera 14 is activated, the camera 14 can capture an image of the target.

In some embodiments, if the electronic device 1 is a smart phone or a tablet computer, the camera 14 can be activated by pressing a camera icon displayed on a touch screen (not shown) of the electronic device 1. In some embodiments, if the electronic device 1 is a camcorder, a video recorder, or a digital camera, the camera 14 can be activated by pressing a button on the electronic device 1. In some embodiments, a focal length of the camera 14 can be zoomed in/zoomed out.

The first control module 240 can control the speaker 18 to emit sound from an audio file stored in the storage device 10.

The second control module 242 can control the speaker 18 to increase a volume of the emitted sound, or replace audio file with another audio file, when a face of the target is not detected by the camera 14 within a predetermined time (e.g., three seconds) from the detected activation of the camera 14. An increase to the volume of the audio file will not hurt the ears of the target.

In first embodiment, the second control module 242 can control the speaker 18 to increase a volume of the emitted sound according to a predetermined relationship between distances to the target from the camera 14. For example, when a distance to the target from the camera 14 is three meters, the second control module 242 can control the volume of the emitted sound to increase three decibels. When a distance to the target from the camera 14 is five meters, the second control module 242 can control the volume of the emitted sound to increase five decibels.

In second embodiment, the second control module 242 can control the volume of the emitted sound to increase by a predetermined value (e.g., three decibels).

In third embodiment, the second control module 242 can control the speaker 18 to play another audio file. For example, the speaker 18 can replace the "Two tigers" currently playing with the "Several ducks".

In fourth embodiment, the second control module 242 can control the electronic device 1 to emit flash. A range of frequency of the flash is 2-5 hertz.

The determination module 26 can detect whether the face of the target is facing the camera 14 for a predetermined duration of time (e.g., three seconds).

Specifically, the determination module 26 can capture a face of the target, and recognize whether the captured face is square-on to the camera 14 or is showing a side or profile of the face, according to face recognition technology. In some embodiments, when a determination is made that the captured face is square-on, the target can be regarded as facing the camera 14. In some embodiments, when a determination is made that the presented face is a side of the face, the target can be regarded as not facing the camera 14. Face recognition technology is very well known and is not described here.

The acquiring module 28 can trigger the camera 14 to take an image of the face of the target and store the image in the storage device 10 when the face of the target is square-on to the camera 14.

Figure 3:
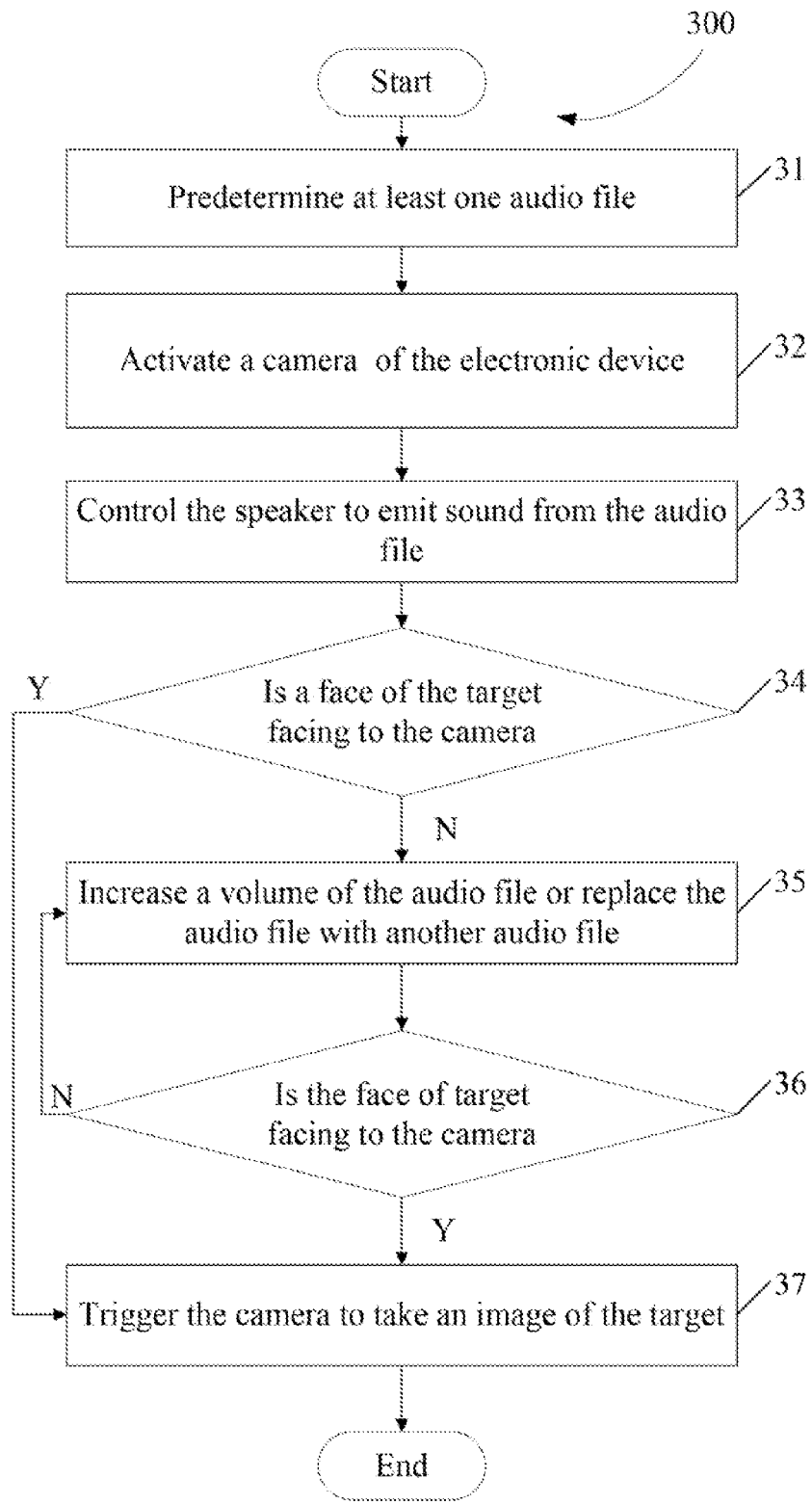
FIG. 3 illustrates a flowchart of one embodiment of a method for taking image of a face.

Referring to FIG. 3, a flowchart is presented in accordance with an example embodiment. The example method 300 is provided by way of example, as there are a variety of ways to carry out the method. The example method 300 described below can be carried out using the configurations illustrated in FIG. 1 and FIG. 2, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed. The example method 300 can begin at block 31. Depending on the embodiment, additional blocks can be added, others removed, and the ordering of the blocks can be changed.

At block 31, a predetermination module predetermines at least one audio file in the storage device of the electronic device.

At block 32, the camera detects an activation of the camera of the electronic device.

At block 33, a first control module controls the speaker 18 to emit sound from an audio file stored in the storage device.

At block 34, a determination module determines whether a face of the target is squarely facing the camera for a predetermined duration of time. If the face of a target is not squarely facing the camera for the predetermined duration, the procedure goes to block 35. If the face of a target is squarely facing the camera 14 for the predetermined duration, the procedure goes to block 37.

At block 35, a second control module controls the speaker 18 to increase a volume of the emitted sound or replace the audio file being currently played with another audio file.

At block 36, the determination module again determines whether the face of a target is squarely facing the camera 14 for the predetermined duration. If the face of a target is not squarely facing the camera 14 for the predetermined duration, the procedure returns to block 35. If the face of a target is squarely facing the camera 14 for the predetermined duration, the procedure goes to block 37.

At block 37, a acquiring module triggers the camera 14 to take an image of face of the target and store the image in the storage device 10.

It should be emphasized that the above-described embodiments of the present disclosure, and of any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included within the scope of this disclosure and protected by the following claims.

What is claimed is:

1. A method for taking a photographic image of a face by an electronic device, the electronic device comprising at least one processor, a speaker, a storage device, and a camera, the method comprising:

detecting, by the at least one processor, an activation of the camera;

controlling, using the at least one processor, the speaker to emit sound from an audio file stored in the storage device to draw attention of a target;

increasing, using the at least one processor, a volume of the emitted sound or replacing the audio file with another audio file when a face of the target is not detected by the camera within a predetermined time from the detected activation of the camera, wherein the volume of the emitted sound is increased according to a predetermined relationship between distances to the target from the camera; and triggering the camera to take an image of the target when the face of the target is facing the camera.

2. An electronic device, comprising:

a speaker;

a camera;

at least one processor; and a non-transitory storage device that stores one or more programs which, when executed by the at least one processor, cause the at least one processor to:

detect, by the at least one processor, an activation of the camera;

control, using the at least one processor, the speaker to emit sound from an audio file stored in the non-transitory storage device to draw attention of a target;

increase, using the at least one processor, a volume of the emitted sound or replace the audio file with another audio file when a face of the target is not detected by the camera within a predetermined time from the detected activation of the camera, wherein the volume of the emitted sound is increased according to a predetermined relationship between distances to the target from the camera; and trigger the camera to take an image of the target when the face of the target is facing the camera.

3. A non-transitory storage medium having stored thereon instructions that, when executed by at least one processor of an electronic device, causes the at least one processor to perform a method for taking a photographic image, the electronic device comprising a speaker and a camera, wherein the method comprises:

detecting, by the at least one processor, an activation of the camera;

controlling, using the at least one processor, the speaker to emit sound from an audio file stored in the non-transitory storage device to draw attention of a target;

increasing, using the at least one processor, a volume of the emitted sound or replacing the audio file with another audio file when a face of the target is not detected by the camera within a predetermined time from the detected activation of the camera, wherein the volume of the emitted sound is increased according to a predetermined relationship between distances to the target from the camera; and triggering the camera to take an image of the target when the face of the target is facing the camera.

* * * * *